US009595388B2

(12) United States Patent
Gloger et al.

(10) Patent No.: US 9,595,388 B2
(45) Date of Patent: *Mar. 14, 2017

(54) BOPP FILM WITH HIGH AC BREAKDOWN STRENGTH

(75) Inventors: Dietrich Gloger, Linz (AT); Katja Klimke, Linz (AT); Joachim Fiebig, St. Marien (AT); Christelle Grein, Linz (AT); Robert Persson, Uddevalla (SE)

(73) Assignee: Borealis AG (AT)

( * ) Notice: Subject to any disclaimer, the term of this patent is extended or adjusted under 35 U.S.C. 154(b) by 542 days.

This patent is subject to a terminal disclaimer.

(21) Appl. No.: 13/813,769

(22) PCT Filed: Aug. 1, 2011

(86) PCT No.: PCT/EP2011/063249
§ 371 (c)(1),
(2), (4) Date: Apr. 15, 2013

(87) PCT Pub. No.: WO2012/016964
PCT Pub. Date: Feb. 9, 2012

(65) Prior Publication Data
US 2013/0303684 A1     Nov. 14, 2013

(30) Foreign Application Priority Data

Aug. 6, 2010   (EP) .................................... 10172111

(51) Int. Cl.
| | |
|---|---|
| *C08K 5/20* | (2006.01) |
| *H01G 4/18* | (2006.01) |
| *C08K 5/05* | (2006.01) |
| *C08F 10/06* | (2006.01) |
| *C08K 5/053* | (2006.01) |
| *C08L 23/12* | (2006.01) |
| *C08F 110/06* | (2006.01) |
| *C08J 5/18* | (2006.01) |
| *C08K 5/00* | (2006.01) |
| *H01B 3/44* | (2006.01) |
| *B29C 55/12* | (2006.01) |

(52) U.S. Cl.
CPC ............... *H01G 4/18* (2013.01); *C08F 10/06* (2013.01); *C08F 110/06* (2013.01); *C08J 5/18* (2013.01); *C08K 5/0083* (2013.01); *C08K 5/05* (2013.01); *C08K 5/053* (2013.01); *C08K 5/20* (2013.01); *C08L 23/12* (2013.01); *H01B 3/441* (2013.01); *B29C 55/12* (2013.01); *B29K 2223/10* (2013.01); *C08J 2323/12* (2013.01)

(58) Field of Classification Search
CPC . C08K 5/20; C08K 5/05; C08K 5/053; C08K 5/0083; C08F 10/06; C08F 110/06; H01G 4/18; C08J 5/18; H01B 3/441; C08L 23/12

See application file for complete search history.

(56) References Cited

U.S. PATENT DOCUMENTS

2003/0195300 A1*  10/2003  Stevens et al. ............... 525/240
2009/0136714 A1*   5/2009  Itou ........................... C08J 5/18
                                                                    428/152

FOREIGN PATENT DOCUMENTS

| EP | 1990353 A1 | 11/2008 |
|---|---|---|
| JP | 59191207 A | 10/1984 |
| JP | 11302471 A | 11/1999 |
| JP | 2003206375 A | 7/2003 |
| JP | 200575847 A | 3/2005 |
| WO | 2008006529 A1 | 1/2008 |

OTHER PUBLICATIONS

Japanese Office Action (English Translation) mailed Jan. 24, 2014.
English Abstract of JP2003-206375 and JP2005-075847.

* cited by examiner

*Primary Examiner* — Peter D Mulcahy
(74) *Attorney, Agent, or Firm* — Tarolli, Sundheim, Covell & Tummino LLP

(57) ABSTRACT

Polypropylene composition comprising a polypropylene and an α-nucleating agent, wherein the polypropylene composition has • a comonomer content of equal or below 1.0 wt.-%, •<2,1> erythro regiodefects of more than 0.1 mol.- %, and • at least 9.0 wt- % of a crystalline fraction crystallizing in the temperature range of above 160 to 170° C., wherein said fraction is determined by the stepwise isothermal segregation technique (SIST).

13 Claims, 2 Drawing Sheets

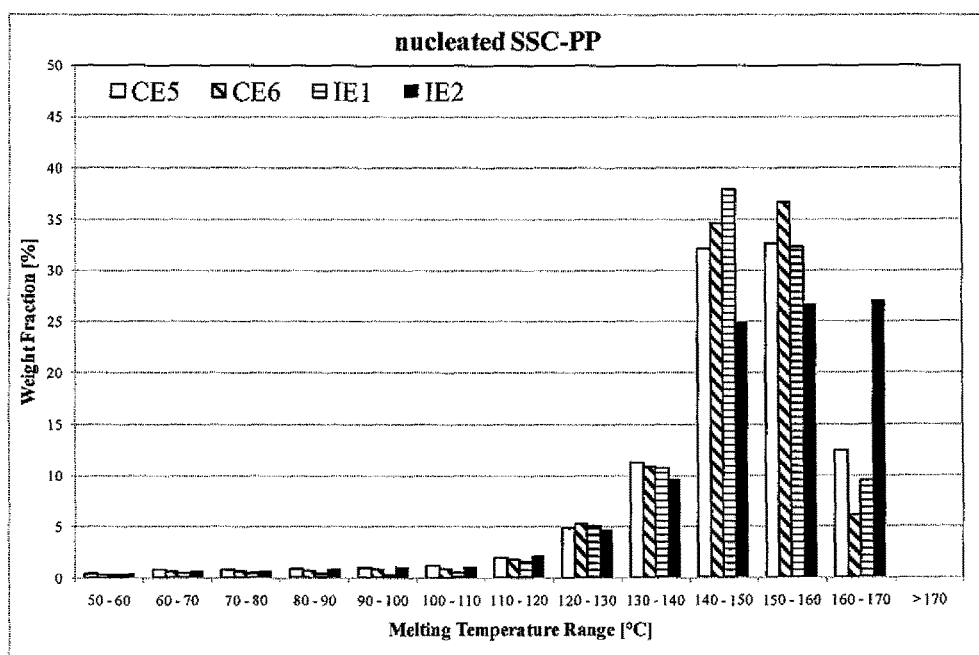
Figure 1: Comparison of the SIST data measured on the CE5, CE6, IE1 and IE2 pellets

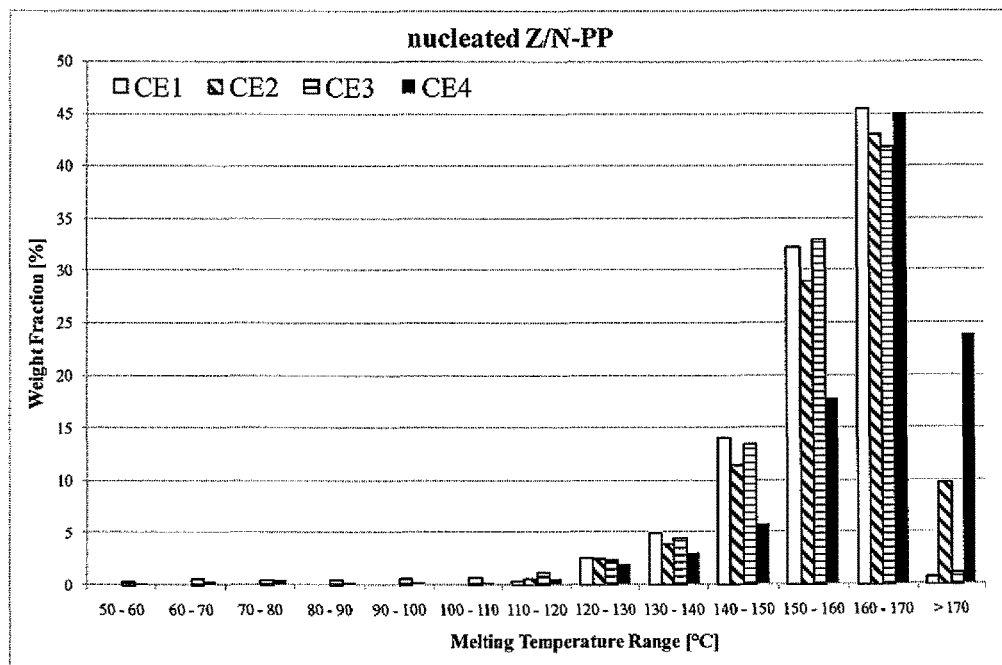
Figure 2: Comparison of the SIST data measured on the CE1 to CE4 pellets

BOPP FILM WITH HIGH AC BREAKDOWN STRENGTH

RELATED APPLICATION

This application is a National Phase filing of PCT/EP2011/063249, filed Aug. 1, 2011, which claims priority from European Application No. 10172111.6, filed Aug. 6, 2010, the subject matter of which are incorporated herein by reference in their entirety.

The present invention relates to a new polypropylene composition and a biaxially oriented polypropylene film as well as a capacitor film made from said polypropylene composition.

Capacitor films must withstand extreme conditions like high temperatures and high electrical breakdown strength. Additionally it is appreciated that capacitor films possess good mechanical properties like a high stiffness and also high operating temperatures. Concerning the electrical breakdown strength one must consider that the overall property or performance of a system (here: a capacitor-film) is dominated by the small extreme local properties of that system. Unfortunately, it is not the strongest extreme value that matters, it is the weakest value that governs the overall performance. Thus even so it is appreciated that a sample of a capacitor film achieves high electrical breakdown values, it must be also assured that different samples of the same capacitor film exhibit also promising electrical breakdown values in average. Thus in other words the capacitor film must have continuously the same properties on each place of said film.

Accordingly to evaluate whether the capacitor film has allover good electrical breakdown performance ten small samples are cut out from said film and each specimen is subjected to an independent breakdown measurement which is performed according to IEC-60243. The small specimens are irreversibly damaged by the measurement. Due to the stochastic nature of breakdown-events, the breakdown-fields that are recorded for each of the 10 samples (from the same film) scatter quite largely and are not Gaussian-distributed, but known as being Weibull-distributed. This is a so called extreme-value distribution. It is therefore necessary to look at the scatter of results, not at the breakdown-voltage alone. The scatter of Weibull-data is characterized by the β-parameter. The lower the β-parameter, the larger the spread of the electrical breakdown results. In light of reliability, the scatter should be as small as possible, hence the β-parameter as large as possible. This means that the task is not only to achieve a high electrical breakdown voltage but also a high β-parameter. Only a high β-parameter ensures that the high electrical breakdown voltage is actually often met by the capacitor film.

As stated above a further aspect in the field of capacitor films is the operating temperature which should be as high as possible. High operating temperatures are achievable in case the heat distortion temperature is rather high.

Therefore the object of the present invention is to provide a polypropylene which assures that a capacitor film made thereof withstands a high electric field strength without causing failure of the same and this performance can be effected with a rather high β-parameter. Preferably such a polypropylene has additionally a high temperature resistance, expressed in terms of heat distortion temperature (HDT) or heat resistance Vicat B.

BRIEF DESCRIPTION OF THE DRAWINGS

FIG. 1 illustrates the comparison of the SIST data measured on the CE5, CE6, 1E1 and 1E2 pellets.

FIG. 2 illustrates the comparison of the SIST data measured on the CE1 to CE4 pellets.

The present invention is based on the finding that an improved breakdown behaviour in view of electrical breakdown strength and β-parameter can be accomplished by using a polypropylene composition for the capacitor film, wherein said polypropylene composition comprises a polypropylene in which an α-nucleating agent is dissolved and said polypropylene is featured by rather high amounts of <2,1> erythro regiodefects and optionally further featured by rather high amounts of crystalline fractions crystallizing in the temperature range of above 140 to 170° C. determined by stepwise isothermal segregation technique (SIST). Such a polypropylene composition makes it possible to obtain biaxially oriented polypropylene (BOPP) films and/or capacitor films with high electrical breakdown strength and high β-parameter.

Thus the present invention is directed to a polypropylene composition (PP-C) comprising (i) at least 70 wt.-%, preferably at least 85 wt.-%, of a polypropylene (PP) and
(ii) 0.005 to 1.5 wt.-% of an α-nucleating agent (N) based on the polypropylene composition (PP-C), wherein the polypropylene composition (PP-C) and/or the polypropylene (PP) has/have (a) a comonomer content of equal or below 1.0 wt.-%, the comonomers are ethylene and/or at least one $C_4$ to $C_{20}$ α-olefin, and
(b) <2,1> erythro regiodefects of more than 0.1 mol.-% determined by $^{13}C$ NMR-spectroscopy, and wherein further (c) the polypropylene composition (PP-C) and/or the polypropylene (PP) has/have a pentad isotacticity <mmmm> of at least 98 mol.-%, and/or (d) the polypropylene composition (PP-C) comprises at least 9.0 wt-% of a crystalline fraction crystallizing in the temperature range of above 160 to 170° C., wherein said fraction is determined by the stepwise isothermal segregation technique (SIST).

Preferably the polypropylene is the only polymer within the polypropylene composition (PP-C).

It has surprisingly been found that such a polypropylene composition makes it possible to obtain capacitor films with good electrical breakdown having also high β-parameter values. Additionally the heat distortion temperature (HDT) and the heat resistance Vicat B are very high.

In the following the present invention is described in more detail.

One important compound of the polypropylene composition (PP-C) is the polypropylene (PP). Thus most of the features relevant for the polypropylene (PP) as such are equally applicable for the final polypropylene composition (PP-C). This holds in particular true for cases in which the polypropylene (PP) is the only polymer within the polypropylene composition (PP-C).

The polypropylene (PP) is featured by a rather low comonomer content. As the polypropylene (PP) is the dominant part of the polypropylene composition (PP-C), also the composition as such is featured by low amounts of comonomers. Accordingly it is preferred that the polypropylene composition (PP-C) and/or the polypropylene (PP) has/have a comonomer content of equal or below 1.0 wt.-%, more preferably equal or below 0.8 wt.-%, yet more preferably equal or below 0.5 wt.-%.

Thus the polypropylene (PP) is preferably a random propylene copolymer (R-PP) or a propylene homopolymer (H-PP), the latter is especially preferred.

In case the polypropylene (PP) is a random propylene copolymer (R-PP) it comprises monomers copolymerizable with propylene, for example comonomers such as ethylene and/or $C_4$ to $C_{20}$ α-olefins, in particular ethylene and/or $C_4$ to $C_{10}$ α-olefins, e.g. 1-butene and/or 1-hexene. Preferably the random propylene copolymer (R-PP) comprises, especially consists of, monomers copolymerizable with propylene from the group consisting of ethylene, 1-butene and 1-hexene. More specifically the random propylene copolymer (R-PP) comprises—apart from propylene—units derivable from ethylene and/or 1-butene. In a preferred embodiment the random propylene copolymer (R-PP) comprises units derivable from ethylene and propylene only. The comonomer content in the random propylene copolymer (R-PP) is preferably in the range of more than 0.5 to 1.0 wt.-%, still more preferably in the range of more than 0.5 to 0.8 wt.-%.

The expression homopolymer used in the instant invention relates to a polypropylene that consists substantially, i.e. of at least 99.5 wt.-%, more preferably of at least 99.8 wt.-%, of propylene units. In a preferred embodiment only propylene units in the propylene homopolymer (H-PP) are detectable. The comonomer content can be determined with $^{13}C$ NMR spectroscopy, as described below in the examples.

The term "random copolymer" indicates that the comonomers within the propylene copolymer (PP) are randomly distributed. The randomness defines the amount of isolated comonomer units, i.e. those which have no neighbouring comonomer units, compared to the total amount of comonomers in the polymer chain. In a preferred embodiment, the randomness of the propylene copolymer (R-PP) is at least 30%, more preferably at least 50%, even more preferably at least 60%, and still more preferably at least 65%.

Preferably the polypropylene (PP) is highly isotactic. Accordingly it is appreciated that the polypropylene composition (PP-C) and/or the polypropylene (PP) has/have a rather high pentad isotacticity <mmmm>, i.e. higher than 98 mol.-%, more preferably higher than 98.5 mol.-%, still more preferably higher than 98.6 mol.-%

A further characteristic of the polypropylene (PP) is that it is preferably produced by a single-site catalyst. Polypropylenes produced by single-site catalyst are inter alia featured by a rather high amount of regio misinsertions of propylene within the polymer chain. Accordingly the polypropylene composition (PP-C) and/or the polypropylene (PP) is/are featured by a high amount of <2,1> erythro regiodefects, i.e. of more than 0.1 mol.-%, more preferably of equal or more than 0.2 mol.-%, yet more preferably of more than 0.4 mol.-%, still more preferably of more than 0.6 mol.-%, like in the range of 0.7 to 0.9 mol.-%, determined by $^{13}C$-NMR spectroscopy.

Commercially available polypropylenes in principle useful for capacitors are featured by rather high xylene cold soluble (XCS) content. The polypropylene (PP) and/or the polypropylene composition (PP-C) of the instant invention is/are featured by rather low xylene cold soluble (XCS) content, i.e. by a xylene cold soluble (XCS) content of equal or below 1.5 wt.-%, more preferably of equal or below 1.3 wt.-%, yet more preferably equal or below 1.0 wt.-%, like equal or below 0.8 wt.-%. Thus it is in particular appreciated that the polypropylene (PP) and/or the polypropylene composition (PP-C) of the instant invention has/have a xylene cold soluble (XCS) content in the range of 0.3 to equal or below 1.5 wt.-%, more preferably in the range of 0.3 to equal or below 1.3 wt.-%, yet more preferably in the range of 0.4 to equal or below 1.0 wt.-%, like in the range of 0.4 to equal or below 0.8 wt.-%.

The amount of xylene cold soluble (XCS) additionally indicates that the polypropylene composition (PP-C) is preferably free of any elastomeric polymer component, like an ethylene propylene rubber. In other words the polypropylene (PP) shall be not a heterophasic polypropylene, i.e. a system consisting of a polypropylene matrix in which an elastomeric phase is dispersed. Such systems are featured by a rather high xylene cold soluble content.

A further characteristic of the polypropylene composition (PP-C) and its polypropylene (PP) is the melting behaviour.

Accordingly it is appreciated that the polypropylene composition (PP-C) and/or the polypropylene (PP) has/have a melting temperature ($T_m$) measured by differential scanning calorimetry (DSC) of at least 150.0° C., more preferably of at least 152° C. Thus it is in particular appreciated that the melting temperature ($T_m$) measured by differential scanning calorimetry (DSC) of the polypropylene composition (PP-C) and/or of the polypropylene (PP) is in the range of 150 to 160° C., more preferably in the range of 151 to 159° C., and yet more preferably in the range of 152 to 155° C. The melting temperatures ($T_m$) given in this paragraph refer in particular to the polypropylene composition (PP-C).

Further it is appreciated that the polypropylene composition (PP-C) and/or the polypropylene (PP) of the instant invention has/have rather high crystallization temperature ($T_c$). Thus it is preferred that the polypropylene composition (PP-C) and/or the polypropylene (PP) has/have crystallization temperature ($T_c$) measured by differential scanning calorimetry (DSC) of at least 110° C., more preferably of at least 113° C. Accordingly the polypropylene has preferably a crystallization temperature ($T_c$) measured by differential scanning calorimetry (DSC) in the range of 110 to 120° C., more preferably in the range of 115 to 119° C. The crystallization temperatures ($T_c$) given in this paragraph refer in particular to the polypropylene composition (PP-C).

The molecular weight distribution (MWD) is the relation between the numbers of molecules in a polymer and the individual chain length. The molecular weight distribution (MWD) is expressed as the ratio of weight average molecular weight ($M_w$) and number average molecular weight ($M_n$). The number average molecular weight ($M_n$) is an average molecular weight of a polymer expressed as the first moment of a plot of the number of molecules in each molecular weight range against the molecular weight. In effect, this is the total molecular weight of all molecules divided by the number of molecules. In turn, the weight average molecular weight ($M_w$) is the first moment of a plot of the weight of polymer in each molecular weight range against molecular weight.

The number average molecular weight ($M_n$) and the weight average molecular weight ($M_w$) as well as the molecular weight distribution (MWD) are determined by gel permeation chromatography (GPC) (ISO 16014-4 2003).

Accordingly it is preferred that the polypropylene composition (PP-C) and/or the polypropylene (PP) has/have a weight average molecular weight ($M_w$) from 100 to 600 kg/mol, more preferably from 200 to 500 kg/mol.

The number average molecular weight ($M_n$) of the polypropylene composition (PP-C) and/or of the polypropylene (PP) is preferably in the range of 5 to 400 kg/mol, more preferably from 10 to 300 kg/mol.

A broad molecular weight distribution (MWD) improves the processability of the polypropylene. Accordingly it is appreciated that the molecular weight distribution (MWD)

measured according to ISO 16014-4 2003 of the polypropylene composition (PP-C) and/or of the polypropylene (PP) is at least 2.0, more preferably at least 2.2, like 2.5. On the other hand a rather broad molecular weight distribution (MWD) indicates rather high amount of low molecular weight fractions which contribute to the xylene soluble content without improving the dielectrical performance. Therefore, in an alternative embodiment the molecular weight distribution (MWD) of the polypropylene composition (PP-C) and/or of the polypropylene (PP) is preferably between 2.0 to equal or below 7.0, still more preferably in the range of 2.0 to 5.0, like 2.5 to 5.0.

Furthermore, it is preferred that the polypropylene (PP) of the present invention has a melt flow rate (MFR) given in a specific range. The melt flow rate measured under a load of 2.16 kg at 230° C. (ISO 1133) is denoted as $MFR_2$ (230° C.). Accordingly, it is preferred that in the present invention the polypropylene composition (PP-C) and/or the polypropylene (PP) has/have an $MFR_2$ (230° C.) of more than 15 g/10 min, more preferably of more than 1.8 g/10 min. Accordingly it is appreciated that the $MFR_2$ (230° C.) measured according to ISO 1133 of the polypropylene composition (PP-C) and/or of the polypropylene (PP) is in the range of 1.5 to 10.0 g/10 min, more preferably in the range of 1.8 to 6.0 g/10 min, like in the range of 2.0 to 4.0 g/10 min.

The polypropylene (PP) can be further unimodal or multimodal, like bimodal in view of the molecular weight distribution and/or the comonomer content distribution.

The expression "multimodal" or "bimodal" used herein refers to the modality of the polymer, i.e.
the form of its molecular weight distribution curve, which is the graph of the molecular weight fraction as a function of its molecular weight,
or
the form of its comonomer content distribution curve, which is the graph of the comonomer content as a function of the molecular weight of the polymer fractions.

It is in particular preferred that the polypropylene (PP)—if it is not unimodal—is multimodal, like bimodal, in view of its molecular weight distribution curve. Accordingly the polypropylene (PP) of the instant invention may comprise a first fraction having an $MFR_2$ (230° C.) in the range of 0.3 to 3.0 g/10 min and a second fraction having an $MFR_2$ (230° C.) in the range of 1.0 to 50.0 g/10 min. Even more preferred the first fraction has a lower $MFR_2$ (230° C.) than the second fraction. Preferably the first fraction is produced in a loop reactor whereas the second fraction is produced in a gas phase reactor.

Further it is appreciated that the polypropylene (PP) is of linear structure and thus does not show (or nearby does not show) a kind of branching. Accordingly it is appreciated that the polypropylene composition (PP-C) and/or the polypropylene (PP) of the instant invention has/have preferably a branching index g' of not less than 0.9, preferably more than 0.9, like at least 0.95. In other words if the polypropylene composition (PP-C) and/or the polypropylene (PP) has/have some kind of branching it shall be rather moderate. Accordingly the branching index g' of the polypropylene composition (PP-C) and/or of the polypropylene (PP) is preferably in the range of 0.9 to 1.0, more preferably in the range of more than 0.9 to 1.0, like in the range of 0.96 to 1.0. In an especially preferred embodiment the polypropylene composition (PP-C) and/or the polypropylene (PP) show(s) no branching, i.e. the polypropylene composition (PP-C) and/or the polypropylene (PP) has/have a branching index g' of 1.0. A low g'-value is an indicator for a high branched polymer.

In other words, if the g'-value decreases, the branching of the polypropylene increases. The exact determination of the g'-value is specified in the example section.

As the polypropylene (PP) according to this invention is preferably of non-branched structure it does also not show a significant amount of gel content. Gels are a typical phenomenon of polypropylenes being crosslinked. Thus the gel content is a good indicator for the chemical modification of the polypropylene composition (PP-C) and/or of the polypropylene (PP). Accordingly the polypropylene composition (PP-C) and/or the polypropylene (PP) of the present invention is/are featured by relatively moderate gel content, i.e. of not more than 0.50 wt.-%, more preferably of not more than 0.25 wt.-%, still more preferably of not more than 0.15 wt.-%, like below 0.15 wt.-%, yet more preferably not more than 0.10 wt.-%, determined as the relative amount of polymer insoluble in boiling xylene (xylene hot insoluble fraction, XHI). In an especially preferred embodiment no gel content is detectable.

As a further component an α-nucleating agent (N) can be present within the polypropylene composition (PP-C). Preferred α-nucleating agents (N) are those which are soluble in the polypropylene (PP). Soluble α-nucleating agents are characterized by demonstrating a sequence of dissolution in heating and recrystallization in cooling to improve the degree of dispersion. Methods for determining said dissolution and recrystallization are described for example by Kristiansen et al. in Macromolecules 38 (2005) pages 10461-10465 and by Balzano et al. in Macromolecules 41 (2008) pages 5350-5355. In detail, the dissolution and recrystallization can be monitored by means of melt rheology in dynamic mode as defined by ISO 6271-10:1999.

Accordingly it is preferred that the α-nucleating agents (N) are selected from the group consisting of sorbitol derivatives, nonitol derivatives, benzene derivatives of formula N-I as defined below, like benzene-trisamides, and mixtures thereof.

Suitable sorbitol derivatives are di(alkylbenzylidene)sorbitols, like 1,3:2,4-dibenzylidenesorbitol or bis-(3,4-dimethylbenzylidene)sorbitol.

Suitable nonitol derivatives include 1,2,3-trideoxy-4,6:5,7-bis-O-[(4-propylphenyl)methylene]-nonitol.

As stated above the benzene derivatives are defined by formula N-I

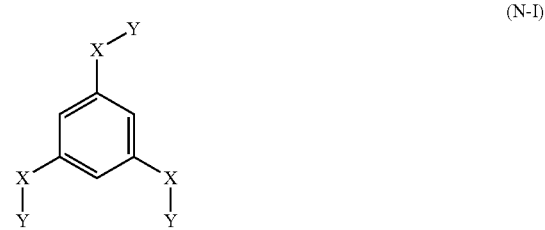

(N-I)

wherein
X is independently selected from the group consisting of —$NR^1$—, —$CR^2R^3$—, —O—, preferably —$NR^1$—,
Y is independently selected from the group consisting —$CR^4R^5R^6$, —$C(O)R^7$,
with
$R^1$ is selected from the group consisting of —H, methyl, ethyl, n-propyl, iso-propyl, and n-butyl, preferably —H,
$R^2$ and $R^3$ are independently selected from the group consisting of —H, methyl, ethyl, n-propyl, iso-propyl, and n-butyl, preferably —H, R⁴, R⁵, and R⁶ are independently selected from the group consisting of —H, methyl, ethyl, n-propyl, iso-propyl, n-butyl, and tert-butyl, or one of the residues R⁴, R⁵, and R⁶ is selected from the group consisting of —H, methyl, ethyl, n-propyl, iso-propyl, and n-butyl, whereas the remaining two residues form with the carbon C an aliphatic five to eight member ring, preferably a substituted or unsubstituted cyclo-hexyl ring, and R7 is selected from the group consisting of methyl, ethyl, n-propyl, iso-propyl, n-butyl, tert-butyl, n-pentyl, cyclo-pentyl, and cyclo-hexyl.

Even more preferred the benzene derivatives are those of formula N-II or N-III, preferably of formula N-III,

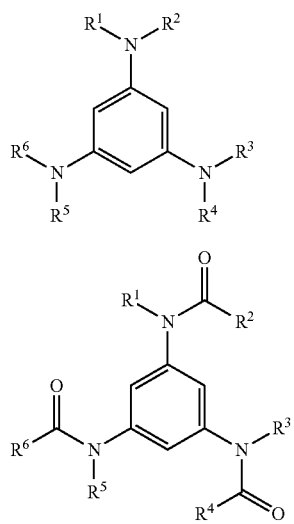

wherein
R¹, R³, R⁵ are independently selected from the group consisting of —H, methyl, ethyl, n-propyl, iso-propyl, preferably —H, and
R², R⁴; R⁶ are independently selected from the group consisting of -ethyl, n-propyl, iso-propyl, n-butyl, tert-butyl, n-pentyl, cyclo-pentyl, and cyclo-hexyl, preferably are independingly selected from the group consisting of iso-propyl, tert-butyl, cyclo-pentyl, and cyclo-hexyl, like iso-propyl or cyclo-hexyl.

Preferably all residues at the benzene-rings of formulas N-I, N-II, N-III are identical.

Accordingly especially preferred benzene derivatives are N,N',N"-tris-tert-butyl-1,3,5-benzenetricarboxamide or N,N',N"-tris-cyclohexyl-1,3,5-benzene-tricarboxamide. The most preferred benzene derivative is N,N',N"-tris-tert-butyl-1,3,5-benzenetricarboxamide.

It has been in particular found out that especially good results are achievable in case the α-nucleating agent (N) has a high degree of molecular symmetry resulting in a net dipole moment close to zero Debeye. The preferred α-nucleating agents have a molecular symmetry classified as $C_{3h}$. Molecules exhibiting high molecular symmetry with small or zero net dipole moments are preferred in dielectric applications since contribution to the dielectric loss tangent is small.

Thus in a preferred embodiment the polypropylene composition (PP-C) of the instant invention comprises at least one α-nucleating (N) having a molecular symmetry classified as $C_{3h}$ and being a benzene derivative of formula N-I, more preferably of formula N-II or N-III, yet more preferably of formula N-III, like N,N',N"-tris-tert-butyl-1,3,5-benzenetricarboxamide or N,N',N"-tris-cyclohexyl-1,3,5-benzene-tricarboxamide. Thus in a particular preferred embodiment the polypropylene composition (PP-C) of the instant invention comprises as α-nucleating agents (N) only those of benzene derivatives of formula N-I, more preferably of formula N-II or N-III, yet more preferably of formula N-III. In an especially preferred embodiment the embodiment the polypropylene composition (PP-C) of the instant invention comprises as α-nucleating agents only N,N',N"-tris-cyclohexyl-1,3,5-benzene-tricarboxamide and/or N,N',N"-tris-tert-butyl-1,3,5-benzenetricarboxamide, the latter one especially preferred.

The polypropylene composition (PP-C) is further characterized by its crystalline fractions obtained by the stepwise isothermal segregation technique (SIST). Different to known polypropylene compositions the inventive polypropylene composition (PP-C) contains rather high amounts of crystalline fractions in the temperature range of 140 to 170° C. Accordingly it is preferred that the polypropylene composition (PP-C) comprises at least 9.0 wt.-%, more preferably of at least 15.0 wt.-%, yet more preferably of at least 20.0 wt.-%, like of at least 24.0 wt.-%, of a crystalline fraction crystallizing in the temperature range of above 160 to 170° C., wherein said fraction is determined by stepwise isothermal segregation technique (SIST). On the other hand the crystalline fraction crystallizing in the temperature range of above 160 to 170° C. of the polypropylene composition (PP-C) should be not too high, i.e. not higher than 40.0 wt.-%, like not higher than 35.0 wt.-%. Accordingly, in a preferred embodiment the polypropylene composition (PP-C) comprises 9.0 to 40.0 wt.-%, more preferably 15.0 to 35.0 wt.-%, yet more preferably 20.0 to 30.0 wt.-%, like 24.0 to 30 wt.-%, of a crystalline fraction crystallizing in the temperature range of above 160 to 170° C.

Preferably the polypropylene composition (PP-C) comprises crystalline fractions crystallizing in the temperature range of
(i) above 140 to 150° C.
(ii) above 150 to 160° C.
(iii) above 160 to 170° C.
wherein the amount of the three crystalline fractions [wt.-%] differ from each other of not more than 5.0 wt.-%, preferably of not more than 4.0 wt.-%, like of not more than 3.0 wt.-%.

Thus values and ranges defined above for the crystalline fraction crystallizing in the temperature range of above 160 to 170° C. is equally applicable for the crystalline fractions crystallizing in the temperature range of above 150 to 160° C. and above 160 to 170° C., respectively.

On the other hand the amount of the crystalline fraction crystallizing above 170° C. is rather low, i.e. of not more than 5.0 wt.-%, preferably of not more than 3.0 wt.-%, more preferably is not detectable.

A further characteristic of the polypropylene composition (PP-C) is preferably the presence of the γ-modification (γ-phase or γ-form) of crystalline polypropylene. Accordingly it is appreciated that the polypropylene composition (PP-C) has a γ-phase of more than 10 to 60%, more preferably of more than 10 to 50%, yet more preferably of more than 10 to 45%, wherein said γ-phase has been measured after stepwise isothermal segregation (SIST) by wide angle x-ray scattering (WAXS).

Additionally it is appreciated that the polypropylene composition (PP-C) has
(a) a heat resistance Vicat B measured according to ISO 306 (50 N) of at least 95° C., more preferably of at least 96° C., like in the range of 95 to 98° C. or 96 to 98° C., and/or
(b) a heat distortion temperature (HDT-B, 0.45N/mm²) measured according to ISO 75-2 of at least 89° C. more preferably of at least 92° C., like in the range of 89 to 97° C. or 92 to 96° C.

One important aspect in capacitor films is the low ash content, otherwise the dielectric properties are negatively affected. Accordingly it is appreciated, even though the instant polypropylene composition (PP-C) requires the presence of α-nucleating agents (N), that the ash content is rather low, i.e. has an ash content measured according to ISO 3451-1 (1997) of equal or below 60 ppm, more preferably equal or below 50 ppm, like in the range of 20 to below 55 ppm.

As usual 1 ppm of additive corresponds to 1 mg additive in 1 kg polypropylene composition (PP-C).

Especially good results are achievable in case the polypropylene composition (PP-C) comprises
(a) at least 70 wt.-%, more preferably at least 85 wt.-%, yet more preferably at least 90 wt.-%, still more preferably at least 95 wt.-%, of the polypropylene (PP),
(b) 0.005 to 1.5 wt.-%, more preferably 0.005 to 0.5 wt.-%, yet more preferably 0.005 to 0.1 wt.-%, still more preferably 0.05 to 0.005 wt.-% of the α-nucleating agents (N).

As stated above the polypropylene (PP) is preferably the only polymer component within the polypropylene composition (PP-C).

Further the invention is also directed to a biaxially oriented polypropylene (BOPP) film, wherein biaxially oriented polypropylene (BOPP) film comprises at least 80 wt.-%, more preferably comprises at least 80 wt.-%, yet more preferably consists of, the polypropylene composition (PP-C) as defined in the present invention. Preferably the biaxially oriented polypropylene (BOPP) film has a stretching ratio of at least 4 times, preferably at least 5 times, in the machine direction and at least 4 times, preferably at least 5 times, in the transverse direction, more preferably has the stretching ration of at least 9 times in the machine direction and at least 5 times in the transverse direction.

More preferably the biaxially oriented polypropylene (BOPP) film has an electrical breakdown strength EB63% according to IEC 60243 part 1 (1998) of at least 310 kV/mm, more preferably of at least 320 kV/mm, like at least 325 KV/mm, measured on a biaxially oriented polypropylene (BOPP) film having a draw ratio in machine direction and in transverse direction of 5.0.

Additionally the polypropylene composition (PP-C) and/or the biaxially oriented polypropylene (BOPP) film of the instant invention can be employed in capacitor films. In such cases the capacitor film comprises at least 80 wt.-%, more preferably at least 90 wt.-%, yet more preferably at least 99 wt.-% of the polypropylene composition (PP-C) or of the biaxially oriented polypropylene (BOPP) film. In an especially preferred embodiment the capacitor film consists of the polypropylene composition (PP-C) or of the biaxially oriented polypropylene (BOPP) film according to this invention.

In the following the preparation of the inventive polypropylene is described in more detail.

The polypropylene (PP) of this invention has been preferably produced in the presence of a single-site catalyst, in particular in the presence of a metallocene catalyst, like a metallocene catalyst of formula (I)

$$R_n(Cp')_2MX_2 \qquad (I)$$

wherein
"M" is zirconium (Zr) or hafnium (Hf), preferably zirconium (Zr),
each "X" is independently a monovalent anionic σ-ligand,
each "Cp'" is a cyclopentadienyl-type organic ligand independently selected from the group consisting of substituted cyclopentadienyl, substituted indenyl, substituted tetrahydroindenyl, and substituted or unsubstituted fluorenyl, said organic ligands coordinate to the transition metal (M),
"R" is a bivalent bridging group linking said organic ligands (Cp'), and
"n" is 1 or 2, preferably 1.

Accordingly the present invention is also directed to a process for the preparation of a polypropylene composition (PP-C) comprising the step of the preparation of the polypropylene (PP) by
(a) polymerizing propylene and optionally ethylene and/or at least one $C_4$ to $C_{20}$ α-olefin in the presence of a solid catalyst system, said solid catalyst system comprises
(i) a transition metal compound of formula (I)

$$(Cp')_2R_nMX_2 \qquad (I)$$

wherein
"M" is zirconium (Zr) or hafnium (Hf), preferably zirconium (Zr),
each "X" is independently a monovalent anionic σ-ligand,
each "Cp'" is a cyclopentadienyl-type organic ligand independently selected from the group consisting of substituted cyclopentadienyl, substituted indenyl, substituted tetrahydroindenyl, and substituted or unsubstituted fluorenyl, said organic ligands coordinate to the transition metal (M),
"R" is a bivalent bridging group linking said organic ligands (Cp'), and
"n" is 1 or 2, preferably 1, and
(ii) optionally a cocatalyst comprising an element of group 13 of the periodic table (IUPAC), preferably a cocatalyst comprising a compound of Al,
(b) melt mixing said polypropylene (PP) obtained in step (a) with an α-nucleating agent (N) obtaining the polypropylene composition (PP-C), and
(c) optionally stretching said polypropylene composition (PP-C) to a biaxially oriented film.

In one specific embodiment the polypropylene (PP) is in particular obtainable, more preferably obtained, by a solid catalyst system comprising the metallocene of formula (I), said catalyst system has a surface of lower than 15 m²/g, still lower than 10 m²/g and most preferred lower than 5 m²/g, which is the lowest measurement limit. The surface area according to this invention is measured according to ASTM D 3663 ($N_2$).

Alternatively or additionally it is appreciated that said solid catalyst system has a porosity of less than 1.30 ml/g and more preferably less than 1.00 ml/g. The porosity has been measured according to ASTM 4641 ($N_2$). In another preferred embodiment the porosity is not detectable when determined with the method applied according to ASTM 4641 ($N_2$).

Furthermore said solid catalyst system typically has a mean particle size of not more than 500 μm, i.e. preferably in the range of 2 to 500 μm, more preferably 5 to 200 μm. It is in particular preferred that the mean particle size is below 80 μm, still more preferably below 70 μm. A preferred range for the mean particle size is 5 to 70 μm, or even 10 to 60 μm.

As stated above the transition metal (M) is zirconium (Zr) or hafnium (Hf), preferably zirconium (Zr).

The term "σ-ligand" is understood in the whole description in a known manner, i.e. a group bound to the metal via a sigma bond. Thus the anionic ligands "X" can independently be halogen or be selected from the group consisting of R', OR', SiR'$_3$, OSiR'$_3$, OSO$_2$CF$_3$, OCOR', SR', NR'$_2$ or PR'$_2$ group wherein R' is independently hydrogen, a linear or branched, cyclic or acyclic, $C_1$ to $C_{20}$ alkyl, $C_2$ to $C_{20}$ alkenyl, $C_2$ to $C_{20}$ alkynyl, $C_3$ to $C_{12}$ cycloalkyl, $C_6$ to $C_{20}$ aryl, $C_7$ to $C_{20}$ arylalkyl, $C_7$ to $C_{20}$ alkylaryl, $C_8$ to $C_{20}$ arylalkenyl, in which the R' group can optionally contain one or more heteroatoms belonging to groups 14 to 16. In a preferred embodiments the anionic ligands "X" are identical and either halogen, like Cl, or methyl or benzyl.

A preferred monovalent anionic ligand is halogen, in particular chlorine (Cl).

The substituted cyclopentadienyl-type ligand(s) may have one or more substituent(s) being selected from the group consisting of halogen, hydrocarbyl (e.g. $C_1$ to $C_{20}$ alkyl, $C_2$ to $C_{20}$ alkenyl, $C_2$ to $C_{20}$ alkynyl, $C_3$ to $C_{20}$ cycloalkyl, like $C_1$ to $C_{20}$ alkyl substituted $C_5$ to $C_{20}$ cycloalkyl, $C_6$ to $C_{20}$ aryl, $C_5$ to $C_{20}$ cycloalkyl substituted $C_1$ to $C_{20}$ alkyl wherein the cycloalkyl residue is substituted by $C_1$ to $C_{20}$ alkyl, $C_7$ to $C_{20}$ arylalkyl, $C_3$ to $C_{12}$ cycloalkyl which contains 1, 2, 3 or 4 heteroatom(s) in the ring moiety, $C_6$ to $C_{20}$-heteroaryl, $C_1$ to $C_{20}$-haloalkyl, —SiR"$_3$, —SR", —PR"$_2$ or —NR"$_2$, each R" is independently a hydrogen or hydrocarbyl (e.g. $C_1$ to $C_{20}$ alkyl, $C_1$ to $C_{20}$ alkenyl, $C_2$ to $C_{20}$ alkynyl, $C_3$ to $C_{12}$ cycloalkyl, or $C_6$ to $C_{20}$ aryl) or e.g. in case of —NR"$_2$, the two substituents R" can form a ring, e.g. five- or six-membered ring, together with the nitrogen atom wherein they are attached to.

Further "R" of formula (I) is preferably a bridge of 1 to 4 atoms, such atoms being independently carbon (C), silicon (Si), germanium (Ge) or oxygen (O) atom(s), whereby each of the bridge atoms may bear independently substituents, such as $C_1$ to $C_{20}$-hydrocarbyl, tri($C_1$ to $C_{20}$-alkyl)silyl, tri($C_1$ to $C_{20}$-alkyl)siloxy and more preferably "R" is a one atom bridge like e.g. —SiR'''$_2$—, wherein each R''' is independently $C_1$ to $C_{20}$-alkyl, $C_2$ to $C_{20}$-alkenyl, $C_2$ to $C_{20}$-alkynyl, $C_3$ to $C_{12}$ cycloalkyl, $C_6$ to $C_{20}$-aryl, alkylaryl or arylalkyl, or tri($C_1$ to $C_{20}$ alkyl)silyl- residue, such as trimethylsilyl-, or the two R''' can be part of a ring system including the Si bridging atom.

In a preferred embodiment the metallocene catalyst, i.e. the transition metal compound, has the formula (II)

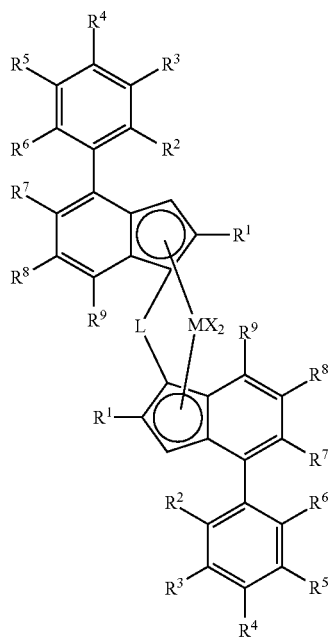

wherein
M is zirconium (Zr) or hafnium (Hf), preferably zirconium (Zr),

X are ligands with a σ-bond to the metal "M", preferably those as defined above for formula (I),
preferably chlorine (Cl) or methyl ($CH_3$), the former especially preferred, $R^1$ are equal to or different from each other, preferably equal to, and are selected from the group consisting of linear saturated $C_1$ to $C_{20}$ alkyl, linear unsaturated $C_1$ to $C_{20}$ alkyl, branched saturated $C_1$-$C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, and $C_7$ to $C_{20}$ arylalkyl, optionally containing one or more heteroatoms of groups 14 to 16 of the Periodic Table (IUPAC), preferably are equal to or different from each other, preferably equal to, and are $C_1$ to $C_{10}$ linear or branched hydrocarbyl, more preferably are equal to or different from each other, preferably equal to, and are $C_1$ to $C_6$ linear or branched alkyl, $R^2$ to $R^6$ are equal to or different from each other and are selected from the group consisting of hydrogen, linear saturated $C_1$-$C_{20}$ alkyl, linear unsaturated $C_1$-$C_{20}$ alkyl, branched saturated $C_1$-$C_{20}$ alkyl, branched unsaturated $C_1$-$C_{20}$ alkyl, $C_3$-$C_{20}$ cycloalkyl, $C_6$-$C_{20}$ aryl, $C_7$-$C_{20}$ alkylaryl, and $C_7$-$C_{20}$ arylalkyl, optionally containing one or more heteroatoms of groups 14 to 16 of the Periodic Table (IUPAC),
preferably are equal to or different from each other and are $C_1$ to $C_{10}$ linear or branched hydrocarbyl, more preferably are equal to or different from each other and are $C_1$ to $C_6$ linear or branched alkyl, $R^7$ and $R^8$ are equal to or different from each other and selected from the group consisting of hydrogen, linear saturated $C_1$ to $C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, $C_7$ to $C_{20}$ arylalkyl, optionally containing one or more heteroatoms of groups 14 to 16 of the Periodic Table (IUPAC), $SiR^{10}_3$, $GeR^{10}_3$, $OR^{10}$, $SR^{10}$ and $NR^{10}_2$, wherein
$R^{10}$ is selected from the group consisting of linear saturated $C_1$-$C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, and $C_7$ to $C_{20}$ arylalkyl, optionally containing one or more heteroatoms of groups 14 to 16 of the Periodic Table (IUPAC),
and/or
$R^7$ and $R^8$ being optionally part of a $C_4$ to $C_{20}$ carbon ring system together with the indenyl carbons to which they are attached, preferably a $C_5$ ring, optionally one carbon atom can be substituted by a nitrogen, sulfur or oxygen atom, $R^9$ are equal to or different from each other and are selected from the group consisting of hydrogen, linear saturated $C_1$ to $C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, $C_7$ to $C_{20}$ arylalkyl, $OR^{10}$, and $SR^{10}$,
preferably $R^9$ are equal to or different from each other and are H or $CH_3$, wherein
$R^{10}$ is defined as before, L is a bivalent group bridging the two indenyl ligands, preferably being a $C_2R^{11}_4$ unit or a $SiR^{11}_2$ or $GeR^{11}_2$, wherein,
$R^{11}$ is selected from the group consisting of H, linear saturated $C_1$ to $C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl or $C_7$ to $C_{20}$ arylalkyl, optionally containing one or more heteroatoms of groups 14 to 16 of the Periodic Table (IUPAC), preferably $Si(CH_3)_2$, $SiCH_3C_6H_{11}$, or $SiPh_2$, wherein $C_6H_{11}$ is cyclohexyl.

Preferably the transition metal compound of formula (II) is $C_2$-symmetric or pseudo-$C_2$-symmetric. Concerning the definition of symmetry it is referred to Resconi et al. Chemical Reviews, 2000, Vol. 100, No. 4 1263 and references herein cited.

Preferably the residues $R^1$ are equal to or different from each other, more preferably equal, and are selected from the group consisting of linear saturated $C_1$ to $C_{10}$ alkyl, linear unsaturated $C_1$ to $C_{10}$ alkyl, branched saturated $C_1$ to $C_{10}$ alkyl, branched unsaturated $C_1$ to $C_{10}$ alkyl and $C_7$ to $C_{12}$ arylalkyl. Even more preferably the residues $R^1$ are equal to or different from each other, more preferably equal, and are selected from the group consisting of linear saturated $C_1$ to $C_6$ alkyl, linear unsaturated $C_1$ to $C_6$ alkyl, branched saturated $C_1$ to $C_6$ alkyl, branched unsaturated $C_1$ to $C_6$ alkyl and $C_7$ to $C_{10}$ arylalkyl. Yet more preferably the residues $R^1$ are equal to or different from each other, more preferably equal, and are selected from the group consisting of linear or branched $C_1$ to $C_4$ hydrocarbyl, such as for example methyl or ethyl.

Preferably the residues $R^2$ to $R^6$ are equal to or different from each other and linear saturated $C_1$ to $C_4$ alkyl or branched saturated $C_1$ to $C_4$ alkyl. Even more preferably the residues $R^2$ to $R^6$ are equal to or different from each other, more preferably equal, and are selected from the group consisting of methyl, ethyl, iso-propyl and tert-butyl.

Preferably $R^7$ and $R^8$ are equal to or different from each other and are selected from hydrogen and methyl, or they are part of a 5-methylene ring including the two indenyl ring carbons to which they are attached. In another preferred embodiment, $R^7$ is selected from $OCH_3$ and $OC_2H_5$, and $R^8$ is tert-butyl.

In a preferred embodiment the transition metal compound is rac-methyl(cyclohexyl)silanediyl bis(2-methyl-4-(4-tert-butylphenyl)indenyl)zirconium dichloride.

Preferably said solid catalyst system comprises additionally a cocatalyst comprising an element of group 13 of the periodic table (IUPAC), for instance the cocatalyst comprises a compound of Al.

Examples of such cocatalysts are organo aluminium compounds, such as aluminoxane compounds.

Such compounds of Al, preferably aluminoxanes, can be used as the only compound in the cocatalyst or together with other cocatalyst compound(s). Thus besides or in addition to the compounds of Al, i.e. the aluminoxanes, other cation complex forming cocatalyst compounds, like boron compounds can be used. Said cocatalysts are commercially available or can be prepared according to the prior art literature. Preferably however in the manufacture of the solid catalyst system only compounds of Al as cocatalyst are employed.

In particular preferred cocatalysts are the aluminoxanes, in particular the C1 to C10-alkylaluminoxanes, most particularly methylaluminoxane (MAO).

Preferably, the organo-zirconium compound of formula (I) (or formula (II)) and the cocatalyst of the solid catalyst system represent at least 70 wt %, more preferably at least 80 wt %, even more preferably at least 90 wt %, even further preferably at least 95 wt % of the solid catalyst system. Thus it is appreciated that the solid catalyst system is featured by the fact that it is self-supported, i.e. it does not comprise any catalytically inert support material, like for instance silica, alumina or $MgCl_2$ or porous polymeric material, which is otherwise commonly used in heterogeneous catalyst systems, i.e. the catalyst is not supported on external support or carrier material. As a consequence of that the solid catalyst system is self-supported and it has a rather low surface area.

In one embodiment the solid metallocene catalyst system is obtained by the emulsion solidification technology, the basic principles of which are described in WO 03/051934. This document is herewith included in its entirety by reference.

Hence the solid catalyst system is preferably in the form of solid catalyst particles, obtainable by a process comprising the steps of a) preparing a solution of one or more catalyst components;
b) dispersing said solution in a second solvent to form an emulsion in which said one or more catalyst components are present in the droplets of the dispersed phase,
c) solidifying said dispersed phase to convert said droplets to solid particles and optionally recovering said particles to obtain said catalyst.

Preferably a first solvent, more preferably a first organic solvent, is used to form said solution. Still more preferably the organic solvent is selected from the group consisting of a linear alkane, cyclic alkane, aromatic hydrocarbon and halogen-containing hydrocarbon.

Moreover the second solvent forming the continuous phase is an inert solvent towards to catalyst components, The second solvent might be immiscible towards the solution of the catalyst components at least under the conditions (like temperature) during the dispersing step. The term "immiscible with the catalyst solution" means that the second solvent (continuous phase) is fully immiscible or partly immiscible i.e. not fully miscible with the dispersed phase solution.

Preferably the immiscible solvent comprises a fluorinated organic solvent and/or a functionalized derivative thereof, still more preferably the immiscible solvent comprises a semi-, highly- or perfluorinated hydrocarbon and/or a functionalized derivative thereof. It is in particular preferred, that said immiscible solvent comprises a perfluorohydrocarbon or a functionalized derivative thereof, preferably $C_3$-$C_{30}$ perfluoroalkanes, -alkenes or -cycloalkanes, more preferred $C_4$-$C_{10}$ perfluoro-alkanes, -alkenes or -cycloalkanes, particularly preferred perfluorohexane, perfluoroheptane, perfluorooctane or perfluoro (methylcyclohexane) or perfluoro (1,3-dimethylcyclohexane or a mixture thereof.

Furthermore it is preferred that the emulsion comprising said continuous phase and said dispersed phase is a bi- or multiphasic system as known in the art. An emulsifier may be used for forming and stabilising the emulsion. After the formation of the emulsion system, said catalyst is formed in situ from catalyst components in said solution.

In principle, the emulsifying agent may be any suitable agent which contributes to the formation and/or stabilization of the emulsion and which does not have any adverse effect on the catalytic activity of the catalyst. The emulsifying agent may e.g. be a surfactant based on hydrocarbons optionally interrupted with (a) heteroatom(s), preferably halogenated hydrocarbons optionally having a functional group, preferably semi-, highly- or perfluorinated hydrocarbons as known in the art. Alternatively, the emulsifying agent may be prepared during the emulsion preparation, e.g. by reacting a surfactant precursor with a compound of the catalyst solution. Said surfactant precursor may be a halogenated hydrocarbon with at least one functional group, e.g. a highly fluorinated C1-n (suitably C4-30- or C5-15) alcohol (e.g. highly fluorinated heptanol, octanol or nonanol), oxide (e.g. propenoxide) or acrylate ester which reacts e.g. with a cocatalyst component, such as aluminoxane to form the "actual" surfactant.

In principle any solidification method can be used for forming the solid particles from the dispersed droplets. According to one preferable embodiment the solidification is effected by a temperature change treatment. Hence the emulsion subjected to gradual temperature change of up to 10° C./min, preferably 0.5 to 6° C./min and more preferably 1 to 5° C./min. Even more preferred the emulsion is subjected to a temperature change of more than 40° C., preferably more than 50° C. within less than 10 seconds, preferably less than 6 seconds.

For further details, embodiments and examples of the continuous and dispersed phase system, emulsion formation method, emulsifying agent and solidification methods reference is made e.g. to the above cited international patent application WO 03/051934.

All or part of the preparation steps can be done in a continuous manner. Reference is made to WO 2006/069733 describing principles of such a continuous or semicontinuous preparation methods of the solid catalyst types, prepared via emulsion/solidification method.

The above described catalyst components are prepared according to the methods described in WO 01/48034.

The polymerization of the polypropylene (PP) can be a bulk polymerization, preferably performed in a so-called loop reactor. Alternatively the polymerization of the polypropylene (PP) is a two stage polymerization performed in a combination of a loop reactor operating in slurry phase and a gas phase reactor as for instance applied in the Borstar polypropylene process.

Preferably, in the process for producing the polypropylene (PP) as defined above the conditions for the bulk reactor of step may be as follows:
  the temperature is within the range of 40° C. to 110° C., preferably between 60° C. and 100° C., 70 to 90° C.,
  the pressure is within the range of 20 bar to 80 bar, preferably between 30 bar to 60 bar,
  hydrogen can be added for controlling the molar mass in a manner known per se.

Subsequently, the reaction mixture from the bulk (bulk) reactor is transferred to the gas phase reactor, whereby the conditions are preferably as follows:
  the temperature is within the range of 50° C. to 130° C., preferably between 60° C. and 100° C.,
  the pressure is within the range of 5 bar to 50 bar, preferably between 15 bar to 35 bar,
  hydrogen can be added for controlling the molar mass in a manner known per se.

The residence time can vary in both reactor zones. In one embodiment of the process for producing the polypropylene (PP) the residence time in bulk reactor, e.g. loop is in the range 0.5 to 5 hours, e.g. 0.5 to 2 hours and the residence time in gas phase reactor will generally be 1 to 8 hours.

If desired, the polymerization may be effected in a known manner under supercritical conditions in the bulk, preferably loop reactor, and/or as a condensed mode in the gas phase reactor.

As stated above the thus obtained polypropylene (PP) is subsequently melt mixed with at least the α-nucleating agent (N) or with an masterbatch of polypropylene containing the desired α-nucleating agent (N) in suitable mixing devices, including in particular extruders, like single screw extruders as well as twin screw extruders. Other suitable melt mixing devices include planet extruders and single screw co-kneaders. Especially preferred are twin screw extruders including high intensity mixing and kneading sections. Suitable melt temperatures for preparing the polypropylenen composition (PP-C) are in the range from 170 to 300° C., preferably in the range from 200 to 260° C. and a screw speed of 50 to 300 rpm.

Further for the manufacture of a biaxially oriented polypropylene (BOPP) film and/or a capacitor film according to this invention the polypropylene (PP) as defined herein is biaxially stretched as know in the art. Preferably the tenter method known in the art is applied.

The tenter method is in particular a method in which the polypropylene (PP) as defined herein is melt extruded from a slit die such as a T-die and cooled on a cooling drum obtaining an undrawn sheet. Said sheet is pre-heated for example with a set of heated metal rolls and then drawn in the length direction between a plurality of rolls over which a difference in peripheral speeds is established and then both edges are gripped with grippers and the sheet is drawn in the transverse direction in an oven by means of a tenter resulting in a biaxially drawn film. The temperature of said stretched sheet during the longitudinal drawing is preferably controlled in such a way as to be below the temperature of the melting point of the polypropylene (PP) as defined herein (5 to 15° C. below $T_m$). The uniformity of the film thickness on transverse drawing can be evaluated with the method in which a fixed region on the film is masked after drawing in the length direction and measuring the actual drawing factor by measuring the spacing of the said masking after transverse drawing.

Subsequently, the film can be treated by corona discharge in air, nitrogen, carbon dioxide gas or any of the mixtures on the surface to be metalized, to improve the adhesive strength to the metal to be deposited, and wound by a winder.

The obtained film can set in a vacuum metallizer. Then, the metal suitable for the purpose concerned is deposited to achieve a predetermined layer resistance. Furthermore, as required, metallization is carried out through a comb-shaped deposition preventive plate to continuously change the resistance value in the transverse direction of the film. The metalized film is slit, to make two metalized reels as a pair for making a capacitor device. Then, the reels are wound to form a device and the device is formed to be flat by a thermal press to make finally a capacitor.

Moreover the present invention is directed to the use of the capacitor film as defined herein in a capacitor.

In addition, the present invention is directed to a capacitor comprising at least on layer comprising a capacitor film as defined herein. Additionally it is preferred that the capacitor comprises a metal layer, in particular a metal layer obtained by the above described process.

The present invention will now be described in further detail by the following examples.

EXAMPLES

A. Measuring Methods

The following definitions of terms and determination methods apply for the above general description of the invention as well as to the below examples unless otherwise defined.

Quantification of Microstructure by NMR Spectroscopy

Quantitative nuclear-magnetic resonance (NMR) spectroscopy was used to quantify the isotacticity, regio-regularity and comonomer content of the polymers.

Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}$C optimised 10 mm extended temperature probehead at 125° C. using nitrogen gas for all pneumatics.

For polypropylene homopolymers approximately 200 mg of material was dissolved in 1,2-tetrachloroethane-d$_2$ (TCE-d$_2$). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromoleucles 30 (1997) 6251). Standard single-pulse excitation was employed utilising the NOE and bi-level WALTZ 16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8k) transients were acquired per spectra For ethylene-propylene copolymers approximately 200 mg of material was dissolved in 3 ml of 1,2-tetrachloroethane-d$_2$ (TCE-d$_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ 16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 6144 (6k) transients were acquired per spectra.

Quantitative $^{13}$C{$^1$H} NMR spectra were processed, integrated and relevant quantitative properties determined from the integrals using proprietary computer programs.

For ethylene-propylene copolymers all chemical shifts were indirectly referenced to the central methylene group of the ethylene block (EEE) at 30.00 ppm using the chemical shift of the solvent. This approach allowed comparable referencing even when this structural unit was not present.

For polypropylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromoleucles 30 (1997) 6251).

Specifically the influence of regio defects and comonomer on the quantification of the tacticity distribution was corrected for by subtraction of representative regio defect and comonomer integrals from the specific integral regions of the stereo sequences.

The isotacticity was determined at the pentad level and reported as the percentage of isotactic pentad (mmmm) sequences with respect to all pentad sequences:

$$[mmmm]\% = 100*(mmmm/\text{sum of all pentads})$$

The presence of 2,1 erythro regio defects was indicated by the presence of the two methyl sites at 17.7 and 17.2 ppm and confirmed by other characteristic sites.

Characteristic signals corresponding to other types of regio defects were not observed (Resconi, L., Cavallo, L., Fait, A., Piemontesi, F., Chem. Rev. 2000, 100, 1253).

The amount of 2,1 erythro regio defects was quantified using the average integral of the two characteristic methyl sites at 17.7 and 17.2 ppm:

$$P_{21e} = (I_{e6} + I_{e8})/2$$

The amount of 1,2 primary inserted propene was quantified based on the methyl region with correction undertaken for sites included in this region not related to primary insertion and for primary insertion sites excluded from this region:

$$P_{12} = I_{CH3} + P_{12e}$$

The total amount of propene was quantified as the sum of primary inserted propene and all other present regio defects:

$$P_{total} = P_{12} + P_{21e}$$

The mole percent of 2,1 erythro regio defects was quantified with respect to all propene:

$$[21e]\text{mol}\% = 100*(P/P_{21e}/P_{total})$$

For copolymers characteristic signals corresponding to the incorporation of ethylene were observed (Cheng, H. N., Macromolecules 17 (1984), 1950).

With regio defects also observed (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) correction for the influence of such defects on the comonomer content was required.

The mole fraction of ethylene in the polymer was quantified using the method of Wang et. al. (Wang, W-J., Zhu, S., Macromolecules 33 (2000), 1157) through integration of multiple signals across the whole spectral region of a $^{13}$C{$^1$H} spectra acquired using defined conditions. This method was chosen for its accuracy, robust nature and ability to account for the presence of regio-defects when needed. Integral regions were slightly adjusted to increase applicability to a wider range of comonomer contents.

The mole percent comonomer incorporation in the polymer was calculated from the mole fraction according to:

$$E[\text{mol}\%] = 100*fE$$

The weight percent comonomer incorporation in the polymer was calculated from the mole fraction according to:

$$E[\text{wt}\%] = 100*(fE*28.05)/((fE*28.05) + ((1-fE)*42.08))$$

The comonomer sequence distribution at the triad level was determined using the method of Kakugo et al. (Kakugo, M., Naito, Y., Mizunuma, K., Miyatake, T. Macromolecules 15 (1982) 1150) through integration of multiple signals across the whole spectral region of a $^{13}$C{$^1$H} spectra acquired using defined conditions. This method was chosen for its robust nature. Integral regions were slightly adjusted to increase applicability to a wider range of comonomer contents.

The mole percent of a given comonomer triad sequence in the polymer was calculated from the mole fraction determined by the method of Kakugo et at. (Kakugo, M., Naito, Y., Mizunuma, K., Miyatake, T. Macromolecules 15 (1982) 1150) according to:

$$XXX[mol\%]=100*fXXX$$

The mole fraction comonomer incorporation in the polymer, as determined from the comonomer sequence distribution at the triad level, were calculated from the triad distribution using known necessary relationships (Randall, J. Macromol. Sci., Rev. Macromol. Chem. Phys. 1989, C29, 201):

$$fXEX=fEEE+fPEE+fPEP$$

$$fXPX=fPPP+fEPP+fEPE$$

where PEE and EPP represents the sum of the reversible sequences PEE/EEP and EPP/PPE respectively.

The randomness of the comonomer distribution was quantified as the relative amount of isolated ethylene sequences as compared to all incorporated ethylene. The randomness was calculated from the triad sequence distribution using the relationship:

$$R(E)[\%]=100*(fPEP/fXEX)$$

Molecular Weight Averages, Molecular Weight Distribution, Branching Index (Mn, Mw, MWD, g') Determined by SEC/VISC-LS Molecular weight averages (Mw, Mn), molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4 2003. A PL 220 (Polymer Laboratories) GPC equipped with a refractive index (RI), an online four capillary bridge viscometer (PL-BV 400-HT), and a dual light scattering detector (PL-LS 15/90 light scattering detector) with a 15° and 90° angle was used. 3× Olexis and 1× Olexis Guard columns from Polymer Laboratories as stationary phase and 1,2,4-trichlorobenzene (TCB, stabilized with 250 mg/L 2,6-Di tert butyl-4-methyl-phenol) as mobile phase at 160° C. and at a constant flow rate of 1 mL/min was applied. 200 µl of sample solution were injected per analysis. The corresponding detector constants as well as the inter detector delay volumes were determined with a narrow PS standard (MWD=1.01) with a molar mass of 132900 g/mol and a viscosity of 0.4789 dl/g. The corresponding dn/dc for the used PS standard in TCB is 0.053 cm³/g.

The molar mass at each elution slice was determined by light scattering using a combination of two angels 15° and 90°. All data processing and calculation was performed using the Cirrus Multi-Offline SEC-Software Version 3.2 (Polymer Laboratories a Varian inc. Company). The molecular weight was calculated using the option in the Cirrus software "use combination of LS angles" in the field "sample calculation options subfield slice MW data from".

The data processing is described in details in G. Saunders, P. A. G: Cormack, S. Graham; D. C. Sherrington, Macromolecules, 2005, 38, 6418-6422. Therein the Mw; at each slice is determined by the 90° angle by the following equation:

$$Mw_i = \frac{K_{LS} * R(\theta)^{90°}}{\frac{dn}{dc} * R * P(\theta)}$$

The Rayleigh ratio $R(\theta)^{90°}$ of the 90° angle is measured by the LS detector and R is the response of the RI-detector. The particle scatter function $P(\theta)$ is determined by the usage of both angles (15° and 90°) as described by C. Jackson and H. G. Barth (C. Jackson and H. G. Barth, "Molecular Weight Sensitive Detectors" in Handbook of Size Exclusion Chromatography and related techniques, C.-S. Wu, 2$^{nd}$ ed., Marcel Dekker, New York, 2004, p. 103). For the low and high molecular region in which less signal of the LS detector or R1 detector respectively was achieved a linear fit was used to correlate the elution volume to the corresponding molecular weight.

The dn/dc used in the equation is calculated from the detector constant of the RI detector, the concentration c of the sample and the area of the detector response of the analysed sample. The relative amount of branching is determined using the g'-index of the branched polymer sample. The long chain branching (LCB) index is defined as $g'=[\eta]_{br}/[\eta]_{lin}$. It is well known if the g' value increases the branching content decreases. [η] is the intrinsic viscosity at 160° C. in trichloorbenzene of the polymer sample at a certain molecular weight and is measured by an online viscosity and a concentration detector. The intrinsic viscosities were measured as described in the handbook of the Cirrus Multi-Offline SEC-Software Version 3.2 with use of the Solomon-Gatesman equation.

The necessary concentration of each elution slice is determined by a RI detector.

$[\eta]_{lin}$ is the intrinsic viscosity of a linear sample and $[\eta]_{br}$ the viscosity of a branched sample of the same molecular weight and chemical composition. The number average of $g'_n$ and the weight average $g'_w$ are defined as:

$$g'_n = \frac{\sum_0^i a_i * \frac{[\eta]_{br,i}}{[\eta]_{lin,i}}}{\sum a_i}$$

$$g'_w = \frac{\sum_0^i A_i * \frac{[\eta]_{br,i}}{[\eta]_{lin,i}}}{\sum_0^i A_i * \left(\frac{[\eta]_{br,i}}{[\eta]_{lin,i}}\right)^2}$$

where $a_i$ is dW/d log M of fraction i and $A_i$ is the cumulative dW/d log M of the polymer up to fraction i. The $[\eta]_{lin}$ of the linear reference (linear isotactic PP) over the molecular weight was measured with an online viscosity detector. Following K and α values were obtained (K=30.68*10$^{-3}$ and α=0.681) from the linear reference in the molecular weight range of log M=4.5-6.1. The $[\eta]_{lin}$ per slice molecular weight for the g' calculations was calculated by following relationship $[\eta]_{lin,i}=K*M_i^\alpha$. $[\eta]_{br,i}$ as measured for each particular sample by online viscosity and concentration detector.

MFR$_2$ (230° C.) is measured according to ISO 1133 (230° C., 2.16 kg load)

Xylene Cold Soluble Fraction (XCS Wt %)

The xylene cold soluble fraction (XCS) is determined at 23° C. according to ISO 6427.

The gel content is assumed to be identical to the xylene hot insoluble (XHI) fraction, which is determined by extracting 1 g of finely cut polymer sample with 350 ml xylene in a Soxhlet extractor for 48 hours at the boiling temperature. The remaining solid amount is dried at 90° C. and weighed for determining the insolubles amount.

Melting temperature ($T_m$) and heat of fusion ($H_f$), crystallization temperature ($T_c$) and heat of crystallization ($H_c$): measured with Mettler TA820 differential scanning calorimetry (DSC) on 5 to 10 mg samples. DSC is run according to ISO 3146/part 3/method C2 in a heat/cool/heat cycle with a scan rate of 10° C./min in the temperature range of +23 to +210° C. Crystallization temperature and heat of crystallization ($H_c$) are determined from the cooling step, while melting temperature and heat of fusion ($H_f$) are determined from the second heating step Heat deflection temperature (HDT-A/B) was measured according to ISO 75-2

Heat resistance Vicat B was measured according to ISO 306 (50 N)

Electrical Breakdown Strength (EB63%)

The electrical breakdown strength was measured according to IEC 60243 part I (1998).

The obtained raw data was evaluated according to IEC 60727, part 1 & 2

The method (IEC 60243 part I) describes a way to measure the electrical breakdown strength for insulation materials on compression moulded plaques. The electrical breakdown strength is determined at 50 Hz within a high voltage cabinet using metal rods as electrodes as described in IEC60243-1 (4.1.2). The voltage is raised over the film/plaque at 2 kV/s until a breakdown occurs.

Definition:

$$Eb: E_b = U_b/d$$

The electrical field strength ($U_b$, [kV]) in the test sample at which breakdown occurs. In homogeneous plaques and films the electrical electric breakdown strength ($E_b$, [kV/mm]) can be calculated by dividing $U_b$ by the thickness of the plaque/film (d, [mm]). The unit of $E_b$ is kV/mm. For each BOPP film, 10 individual breakdown measurements are performed. To characterize a material via its breakdown strength a parameter describing an average breakdown strength must be derived from the 10 individually obtained results. This parameter is often referred to as Eb63% parameter. To obtain this parameter a statistical evaluation as described in IEC 60727, part 1 & 2 was carried out which is briefly outlined here: The 10 individual breakdown results ($E_b$, kV/mm) per BOPP film are evaluated using a Weibull plot, wherein the 63 percentile (scale parameter of the Weibull distribution) is used to characterize the material's breakdown strength (Eb63%). The β-parameter is the slope of the linear regression curve through these 10 points. The β-parameter is the shape parameter of the Weibull distribution.

Porosity: BET with $N_2$ gas, ASTM 4641, apparatus Micromeritics Tristar 3000; sample preparation: at a temperature of 50° C., 6 hours in vacuum.

Surface area: BET with $N_2$ gas ASTM D 3663, apparatus Micromeritics Tristar 3000: sample preparation at a temperature of 50° C., 6 hours in vacuum.

Stepwise Isothermal Segregation Technique (SIST)

The isothermal crystallisation for SIST analysis was performed in a Mettler TA820 DSC on 3±0.5 mg samples at decreasing temperatures between 200° C. and 105° C.

(i) the samples were melted at 225° C. for 5 min.,
(ii) then cooled with 80° C./min to 145° C.
(iii) held for 2 hours at 145° C.,
(iv) then cooled with 80° C./min to 135° C.
(v) held for 2 hours at 135° C.,
(vi) then cooled with 80° C./min to 125° C.
(vii) held for 2 hours at 125° C.,
(viii) then cooled with 80° C./min to 115° C.
(ix) held for 2 hours at 115° C.,
(x) then cooled with 80° C./min to 105° C.
(xi) held for 2 hours at 105° C.

After the last step the sample was cooled down with 80 C/min to −10° C. and the melting curve was obtained by heating the cooled sample at a heating rate of 10° C./min up to 200° C.

All measurements were performed in a nitrogen atmosphere. The melt enthalpy is recorded as function of temperature and evaluated through measuring the melt enthalpy of fractions melting within temperature intervals of 50 to 60° C.; 60 to 70° C.; 70 to 80° C.; 80 to 90° C.; 90 to 100° C.; 100 to 110° C.; 110 to 120° C.; 120 to 130° C.; 130 to 140° C.; 140 to 150° C.; 150 to 160° C.; 160 to 170° C.; 170 to 180° C.; 180 to 190° C.; 190 to 200° C.

Ash content: Ash content is measured according to ISO 3451-1 (1997)

Wide-Angle X-ray Scattering (WAXS)

The determination of crystallinity and of polymorphic composition was performed in reflection geometry using a Bruker D8 Discover with GADDS x-ray diffractometer operating with the following settings: x-ray generator: 30 kV and 20 mA; $\theta_1=6°$ & $\theta_2=13°$; sample-detector distance: 20 cm; beam size (collimator): 500 μm; and duration/scan: 300 seconds. 3 measurements have been performed on each sample. Intensity vs. 2θ curves between 2θ=10° and 2θ=32.5° were obtained by integrating the 2-dimensional spectra.

The quantification of intensity vs. 2θ curves were then performed as follows:

Intensity vs. 2θ curve was acquired with the same measurement settings on an amorphous iPP sample, which was prepared by solvent extraction. An amorphous halo was obtained by smoothing the intensity vs. 2θ curve. The amorphous halo has been subtracted from each intensity vs. 2θ curve obtained on actual samples and this results in the crystalline curve. The crystallinity index X, is defined with the area under the crystalline curve and the original curve using the method proposed by Challa et al. (Makromol. Chem. vol. 56 (1962), pages 169-178) as:

$$X_C = \frac{\text{Area under crystalline curve}}{\text{Area under original spectrum}} \times 100$$

In a two-phase crystalline system (containing α- and β-modifications), the amount of β-modification within the crystalline phase B was calculated using the method proposed by Turner-Jones et al. (Makromol. Chem. Vol. 75 (1964), pages 134-158) as:

$$B = \frac{I^\beta(300)}{I^\alpha(110) + I^\alpha(040) + I^\alpha(130) + I^\beta(300)}$$

where, $I^\beta(300)$ is the intensity of β(300) peak, $I^\alpha(110)$ is the intensity of α(110) peak, $I^\alpha(040)$ is the intensity of α(040)

peak and $I^\alpha(130)$ is the intensity of $\alpha(130)$ peak obtained after subtracting the amorphous halo. The wt.-% of β-form was calculated by multiplying B by 100.

In a two-phase crystalline system (containing α- and γ-modifications), the amount of γ-modification within the crystalline phase G was calculated using the method developed by Pae (J. Polym. Sci., Part A2, vol. 6 (1968), pages 657-663) as:

$$G = \frac{I^\gamma(117)}{I^\alpha(130) + I^\gamma(117)}$$

where, $I^\alpha(130)$ is the intensity of $\alpha(130)$ peak and $I^\gamma(117)$ is the intensity of γ(117) peak obtained after subtracting a base line joining the base of these peaks. The wt.-% of γ-form was calculated by multiplying G by 100.

B. Examples

The used catalyst for PP2 was prepared according to example 5 of WO 03/051934 wherein the catalyst used therein was replaced by rac-methyl(cyclohexyl)silanediyl bis(2-methyl-4-(4-tert-butylphenyl)indenyl)zirconium dichloride. The base polymer PP2 of examples CE4, CE 5, CE 6, I1 and I2 were produced employing above mentioned catalyst in a continuous two step polymerization process consisting of a bulk polymerization process (loop reactor) and a gas phase polymerization step. Prior to entering the bulk polymerization step, the catalyst is pre-polymerized to a certain polymerization degree in a loop-type pre polymerization reactor. Hydrogen levels in the pre polymerization reactor, in the loop reactor and the gas phase reactors were different respectively and adjusted so that the molecular weight (MFR) of the polymer from the first polymerization step was different from the molecular weight (MFR) of the polymer from the second polymerization step. The weight fraction of loop product (split) can be varied between 30 and 70 wt %. The nucleated compounds as given in table 1 have been compounded on a ZSK 18 co-rotating twin screw extruder (Coperion W&P), employing either PP 1 or PP2 as base polymer. The BOPP films used for the breakdown strength measurements have been obtained by subjecting the materials of table 1 to a cast film process first. The casted sheets were approximately 500 μm thick, generated by extruding the melt (230° C.) through a slit die onto a chill roll having a temperature of 90° C. For the subsequent biaxial orientation, square specimens were cut out from the central area of each cast film (8.5 cm by 8.5 cm samples). These specimens were biaxially stretched on a BOPP machine ("Karo IV laboratory stretcher" Bruckner Maschinenbau GmbH, Germany). The stretching-process was done at a strain rate of 870%/s and temperature of 152° C. (for CE1, CE2, CE3, CE4) and ~142° C. (for CE5, CE6, I1, I2). The stretching device was operating in a simultaneous manner and BOPP films with a draw-ratio of 5×5 and a final thickness of 20 μm were obtained. This just described process starting with the cast film extrusion was performed twice for each material, thus each BOPP film was present as replicate for the further analysis (breakdown testing). The BDV reported in table 3 was obtained as follows:

Per BOPP film, 10 breakdown voltages ($E_b$, kV) are recorded on small specimens (5×5 cm) cut from the central area of the BOPP film. The recorded breakdown voltage was normalized to the samples' thickness which was additionally measured at a location close to the breakdown-point. The so calculated breakdown strengths (kV/mm) were further evaluated using a Weibull probability plot as described in IEC 60727, part 1 & 2. The 10 individual results are ranked and the cumulative failure probability is estimated using equation 1

$$F(x_i) = \frac{i - 0.3}{n + 0.4}$$

$F(x_i)$ Cumulative probability of breakdown
i $i^{th}$ measurement (1 to 10)
n number of measurements (10)

In following this procedure 10 pairs of breakdown strength (kV/mm) and a corresponding failure probability became available per BOPP film. In case the 10 dielectric strengths obtained per BOPP film follow a Weibull distribution, a straight line results when plotting the data pairs in a Weibull plot. The average breakdown strength of the BOPP film on which the 10 results were obtained is estimated as the $63.2^{th}$ percentile of this plot. The slope of the linear fit to the data-points in such a Weibull-plot is given as the β-parameter and relates to the spread in the data (10 measurements). Due to the replication of the BOPP film generation, per material 10+10 breakdown data points became available. Thus the above described evaluation (Weibull plot to estimate the $63.2^{th}$ percentile) was performed using all breakdown data, treated as if they were obtained on one BOPP film. The BDV reported in table 3 is the Eb63% parameter derived in a procedure as outlined above, using n=20.

TABLE 0

Properties of the base polymers

| | $M_W$ [kg/ mol] | $M_N$ [kg/ mol] | MWD | XCS [wt.-%] | IV [ml/ g] | $T_M$ [° C.] | mmmm [%] | [2.1e] [%] |
|---|---|---|---|---|---|---|---|---|
| PP1 | 406 | 50 | 7 | 3.5 | 263 | 161 | 92.3 | 0.0 |
| PP2 | 318 | 119 | 2.7 | 0.68 | 230 | 152 | 98.7 | 0.7 |

TABLE 1

Compositions

| | | CE 1 | CE 2 | CE 3 | CE 4 | CE 5 | CE 6 | I 1 | I 2 |
|---|---|---|---|---|---|---|---|---|---|
| MFR | [g/10 min] | 2.8 | 2.9 | 2.6 | 2.8 | 2.2 | 2.3 | 2.4 | 2.3 |
| PP1 | [wt-%] | 97.5 | 96.5 | 97.5 | 97.5 | 0 | 0 | 0 | 0 |
| PP2 | [wt-%] | 0 | 0 | 0 | 0 | 99.55 | 98.55 | 99.35 | 99.535 |
| A | [wt-%] | 2.4 | 2.4 | 2.2 | 2.385 | 0 | 0 | 0 | 0 |
| AO | [wt-%] | 0.1 | 0.1 | 0.1 | 0.1 | 0.45 | 0.45 | 0.45 | 0.45 |
| NA1 | [wt-%] | 0 | 1 | 0 | 0 | 0 | 1 | 0 | 0 |

TABLE 1-continued

| | | Compositions | | | | | | | |
|---|---|---|---|---|---|---|---|---|---|
| | | CE 1 | CE 2 | CE 3 | CE 4 | CE 5 | CE 6 | I 1 | I 2 |
| NA2 | [wt-%] | 0 | 0 | 0.2 | 0 | 0 | 0 | 0.2 | 0 |
| NA3 | [wt-%] | 0 | 0 | 0 | 0.015 | 0 | 0 | 0 | 0.015 |

PP1 is the commerical propylene homopolymer HB311BF of Borealis AG.
PP2 is the propylene homopolymer as produced indicated above
A is HC001A-B1, a reactor powder equivalent to HB311BF, but prior to any additivation
AO is the antioxidant pentaerythrityl-tetrakis(3-(3',5'-di-tert. butyl-4-hydroxyphenyl)-propionate
NA1 is the commercial propylene homo polymer HC904BF of Borealis AG. It is produced using the Borealis proprietary Borstar nucleation technology
NA2 is the commercial α-nucleating agent NX 8000 of Milliken
NA3 is the commercial α-nucleating agent Irgaclear XT 386 of Ciba

TABLE 2

| | | Properties of the compositions | | | | | | | |
|---|---|---|---|---|---|---|---|---|---|
| | | CE 1 | CE 2 | CE 3 | CE 4 | CE 5 | CE 6 | I 1 | I 2 |
| Tm | [° C.] | 160.5 | 163.2 | 163.1 | 163.1 | 152 | 153.1 | 153.9 | 153.4 |
| Tc | [° C.] | 113.9 | 123.9 | 123.3 | 122.6 | 114.3 | 118.5 | 121.8 | 120.7 |
| HDT A | [° C.] | 50.8 | 54.6 | 54.4 | 52.7 | 54.3 | 55.1 | 54.2 | 56.4 |
| HDT B | [° C.] | 76.8 | 85.8 | 83.7 | 81.6 | 88.9 | 90.8 | 89.9 | 94.8 |
| Vicat B | [° C.] | 89.4 | 93.6 | 93.3 | 92.9 | 95.3 | 97.2 | 96.4 | 97.6 |
| Ash | [ppm] | 49 | 33 | 26 | 40 | 50 | 49 | 51 | 47 |
| $K_\gamma$ | [%] | 0.05 | 0.05 | 0.07 | 0.03 | 0.48 | 0.53 | 0.55 | 0.40 |

TABLE 3

| | | Properties of the BOPP films | | | | | | | |
|---|---|---|---|---|---|---|---|---|---|
| | | CE 1 | CE 2 | CE 3 | CE 4 | CE 5 | CE 6 | I 1 | I 2 |
| BDV | [kV/mm] | 311 | 296 | 296 | 313 | 317 | 302 | 322 | 330 |
| β | [—] | 9 | 11 | 13 | 9 | 15 | 16 | 16 | 15 |

TABLE 4

| | SIST Properties of the compositions | | | | | | | |
|---|---|---|---|---|---|---|---|---|
| T [° C.] | CE 1 [wt.-%] | CE 2 [wt.-%] | CE 3 [wt.-%] | CE 4 [wt.-%] | CE 5 [wt.-%] | CE 6 [wt.-%] | I 1 [wt.-%] | I 2 [wt.-%] |
| 50-60 | 0.0 | 0.0 | 0.3 | 0.2 | 0.4 | 0.4 | 0.3 | 0.4 |
| 60-70 | 0.0 | 0.0 | 0.6 | 0.4 | 0.8 | 0.7 | 0.6 | 0.7 |
| 70-80 | 0.0 | 0.0 | 0.5 | 0.5 | 0.8 | 0.7 | 0.6 | 0.7 |
| 80-90 | 0.0 | 0.0 | 0.5 | 0.3 | 0.9 | 0.8 | 0.5 | 0.9 |
| 90-100 | 0.0 | 0.0 | 0.5 | 0.3 | 1.0 | 0.9 | 0.4 | 1.1 |
| 100-110 | 0.0 | 0.0 | 0.6 | 0.2 | 1.2 | 0.9 | 0.5 | 1.1 |
| 110-120 | 0.4 | 0.6 | 1.2 | 0.6 | 2.0 | 1.9 | 1.6 | 2.1 |
| 120-130 | 2.5 | 2.5 | 2.3 | 2.0 | 4.8 | 5.3 | 5.1 | 4.7 |
| 130-140 | 4.9 | 3.9 | 4.4 | 3.0 | 11.3 | 11.0 | 10.7 | 9.7 |
| 140-150 | 14.0 | 11.4 | 13.4 | 5.8 | 32.0 | 34.6 | 38.0 | 24.9 |
| 150-160 | 32.1 | 28.9 | 32.9 | 17.7 | 32.5 | 36.7 | 32.2 | 26.7 |
| 160-170 | 45.5 | 43.0 | 41.8 | 45.1 | 12.4 | 6.2 | 9.5 | 27.0 |
| >170 | 0.6 | 9.8 | 1.0 | 23.9 | 0.0 | 0.0 | 0.0 | 0.0 |

The invention claimed is:

1. A capacitor comprising at least one layer comprising a capacitor film comprising a biaxially oriented polypropylene (BOPP) film comprising a polypropylene composition (PP-C), the polypropylene composition (PP-C) comprising:
    (i) at least 70 wt. % of a polypropylene (PP) and
    (ii) 0.005 to 1.5 wt. % of an α-nucleating agent (N) based on the polypropylene composition (PP-C), wherein the polypropylene composition (PP-C) and/or the polypropylene (PP) has/have
    (a) a comonomer content of equal or below 1.0 wt. %, the comonomers are ethylene and/or at least one $C_4$ to $C_{20}$ α-olefin, and
    (b) <2,1> erythro regiodefects of more than 0.1 mol. % determined by $^{13}C$-spectroscopy,
    and wherein further
    (c) the polypropylene composition (PP-C) and/or the polypropylene (PP) has/have a pentad isotacticity <mmmm> of at least 98 mol. %, and/or
    (d) the polypropylene composition (PP-C) comprises at least 9.0 wt % of a crystalline fraction crystallizing in the temperature range of above 160 to 170° C., wherein said fraction is determined by the stepwise isothermal segregation technique (SIST),
    wherein the biaxially oriented (BOPP) film has an electrical breakdown strength EB63% derived from data measured according to IEC 60243 part 1 (1998) and evaluated according to IEC 60727, part 1 & 2 of at least 310 kV/mm obtained on a biaxially oriented direction of 5.0.

2. The capacitor according to claim 1, wherein the polypropylene (PP) is the only polymer within the polypropylene composition (PP-C).

3. The capacitor according to claim 1, wherein:
    (a) the polypropylene composition (PP-C) comprises crystalline fractions crystallizing in the temperature range of;
        (i) above 140 to 150° C.
        (ii) above 150 to 160° C.
        (iii) above 160 to 170° C.
    wherein the amount of the three crystalline fractions [wt. %] differ from each other of not more than 5.0 wt. %, and/or
    (b) the amount of the crystalline fraction of the polypropylene composition (PP-C) crystallizing in the temperature range of above 160 to 170° C., is not more than 35 wt. %, and/or
    (c) the polypropylene composition (PP-C) has a crystalline fraction crystallizing above 170° C. of not more than 5.0 wt. %, wherein said fractions are determined by the stepwise isothermal segregation technique (SIST).

4. The capacitor according to claim 1, wherein the polypropylene composition (PP-C) and/or the polypropylene (PP) has/have:
   (a) a melting temperature ($T_m$) measured by differential scanning calorimetry (DSC) of at least 150.0° C., and/or
   (b) a crystallization temperature ($T_c$) measured by differential scanning calorimetry (DSC) of at least 110° C.

5. The capacitor according to claim 1, wherein the polypropylene composition (PP-C) has
   (a) a heat resistance Vicat B measured according to ISO 306 (50 N) of at least 95° C., and/or
   (b) a heat distortion temperature (HDT-B) measured according to ISO 75-2 of at least 89° C.

6. The capacitor according to claim 1, wherein the polypropylene composition (PP-C) has:
   (a) a γ-phase of more than 10 to 60% wherein said γ-phase has been measured after stepwise isothermal segregation (SIST) by wide angle x-ray scattering (WAXS), and/or
   (b) an ash content measured according to ISO 3451-1 (1997) of below 60 ppm.

7. The capacitor according to claim 1, wherein the polypropylene composition(PP-C) and/or the polypropylene (PP) has/have:
   (a) a molecular weight distribution (MWD) measured according to ISO 16014 of at least 3.0, and/or
   (b) a melt flow rate $MFR_2$ (230° C.) measured according to ISO 1133 of more than 1.5 g/10 min, and/or
   (c) a xylene cold soluble fraction (XCS) determined at 23° C. according ISO 6427 of equal or below 1.5 wt. %.

8. The capacitor according to claim 1, wherein the polypropylene composition (PP-C) and/or the polypropylene (PP) has/have a branching index g' of at least 0.9.

9. The capacitor according to claim 1, wherein the α-nucleating agent (N) is selected from the grouwp consisting of sorbitol derivatives, nonitol derivatives, benzene-trisamides, and mixtures thereof.

10. The capacitor according to claim 1, wherein the α-nucleating agent (N):
    (a) is soluble in the polypropylene (PP) and/or
    (b) has a molecular symmetry classified as $C_{3h}$.

11. The capacitor according to claim 1, comprising at least 90 wt. % of the polypropylene composition(PP-C).

12. The capacitor according to claim 1, wherein said film has:
    a draw ratio in machine direction of at least 4.0 and a draw ratio in transverse direction of at least 4.0.

13. Process for the preparation of a capacitor comprising a capacitor film comprising a polypropylene composition (PP-C), comprising the step of preparation of a polypropylene (PP) by:
    (a) polymerizing propylene and optionally ethylene and/or at least one $C_4$ to $C_{20}$ α-olefin in the presence of a solid catalyst system, said solid catalyst system comprises:
    (i) a transition metal compound of formula (I)

$$(Cp')_2 R_n MX_2 \qquad (I)$$

wherein
    "M" is zirconium (Zr) or hafnium (Hf),
    each "X" is independently a monovalent anionic σ-ligand,
    each "Cp'" is a cyclopentadienyl-type organic ligand independently selected from the group consisting of substituted cyclopentadienyl, substituted indenyl, substituted tetrahydroindenyl, and substituted or unsubstituted fluorenyl, said organic ligands coordinate to the transition metal (M),
    "R" is a bivalent bridging group linking said organic ligands (Cp'), and
    "n" is 1 or 2, preferably 1, and
    (ii) optionally a cocatalyst comprising an element of group 13 of the periodic table (IUPAC),
    (b) melt mixing said polypropylene (PP) obtained in step (a) with an α-nucleating agent (N) obtaining the polypropylene composition (PP-C), and
    (c) stretching said polypropylene composition (PP-C) to a biaxially oriented film,
    wherein the polypropylene (PP) and the α-nucleating agent (N) are defined according to claim 1.

* * * * *